United States Patent [19]

Fiedor et al.

[11] Patent Number: 4,914,828
[45] Date of Patent: Apr. 10, 1990

[54] SURFACE INSPECTION DEVICE AND METHOD

[75] Inventors: Robert J. Fiedor, Lower Burrell; Aloysius W. Farabaugh, Verona, both of Pa.

[73] Assignee: PPG Industries, Inc., Pittsburgh, Pa.

[21] Appl. No.: 230,206

[22] Filed: Aug. 9, 1988

[51] Int. Cl.⁴ .............................................. G01B 7/34
[52] U.S. Cl. ........................................ 33/554; 33/551; 33/558; 33/552
[58] Field of Search ............... 323/345, 546, 551, 556, 323/553, 554, 524, 558, 501.03, 501.07, 501.1, 501.2

[56] References Cited

U.S. PATENT DOCUMENTS

| | | | |
|---|---|---|---|
| 3,056,209 | 10/1962 | Oliver | 33/554 |
| 3,068,581 | 12/1962 | Skalwold et al. | 33/551 |
| 3,479,744 | 11/1969 | Howland et al. | 33/551 |
| 3,755,906 | 9/1973 | Unterberger | 33/172 R |
| 4,213,245 | 7/1980 | Armstrong | 33/558 |
| 4,324,049 | 4/1982 | Blose | 33/551 |
| 4,548,070 | 10/1985 | Panetti | 33/552 |
| 4,679,331 | 7/1987 | Koontz | 33/551 |
| 4,765,065 | 8/1988 | Bennett | 33/172 R |

FOREIGN PATENT DOCUMENTS

| | | | |
|---|---|---|---|
| 0140817 | 6/1986 | Japan | 33/551 |
| 0286701 | 12/1986 | Japan | 33/552 |

Primary Examiner—Thomas B. Will
Attorney, Agent, or Firm—Dennis G. Millman

[57] ABSTRACT

A method and apparatus for measuring surface irregularities on articles such as curved automotive glass are provided wherein two contact points on a sensor head establish a chord at a segment of the surface and a probe measures the distance of the surface from the chord between the contact points, thereby permitting calculation of the local radius of curvature as the surface is scanned.

17 Claims, 2 Drawing Sheets

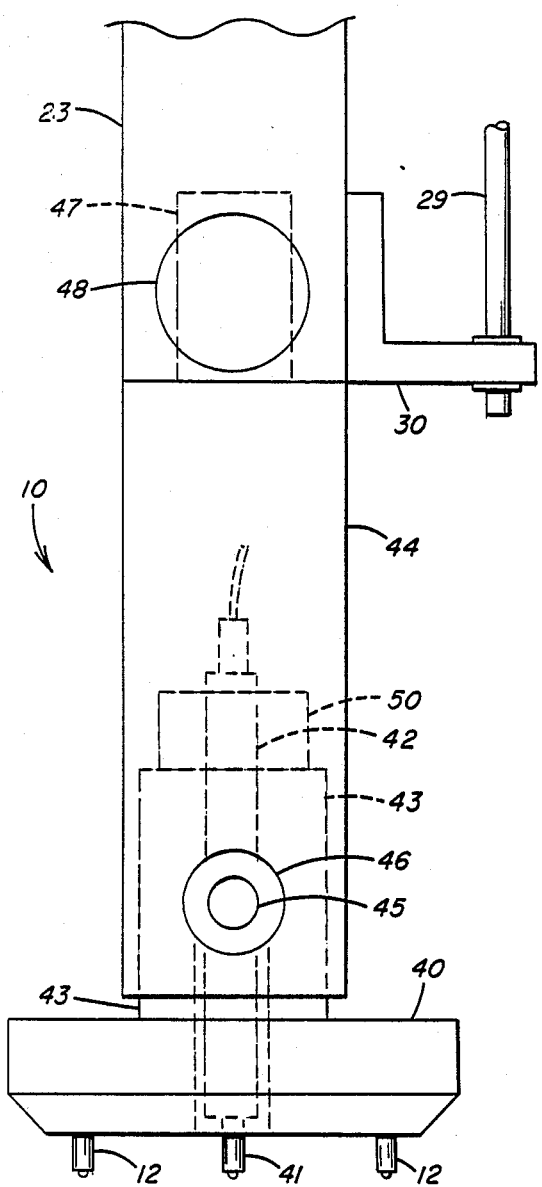
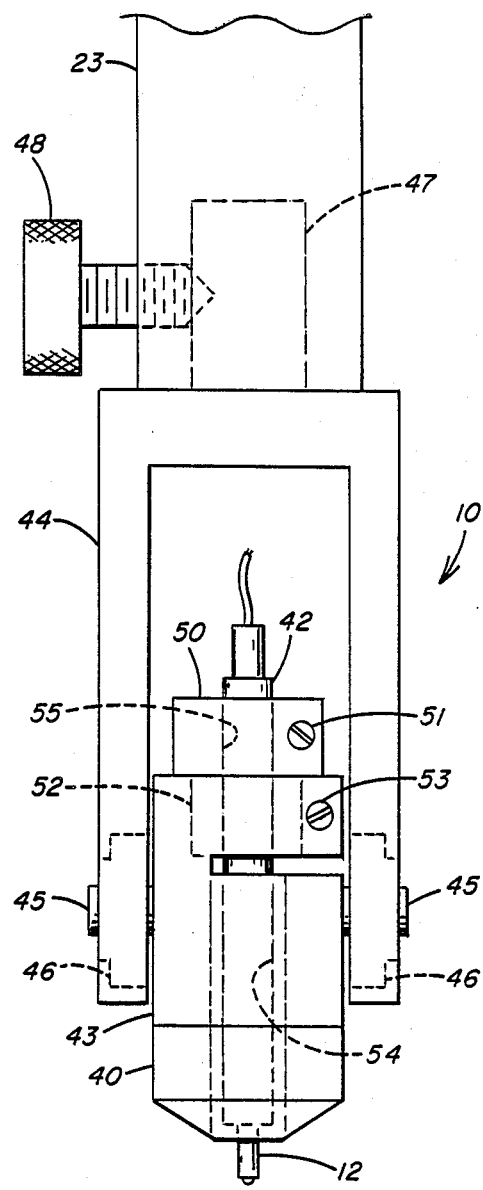
FIG. 3
FIG. 4

SURFACE INSPECTION DEVICE AND METHOD

BACKGROUND OF THE INVENTION

The present invention deals with the detection of very small contour variations on the surface of an article and is particularly characterized by the ability to inspect curved surfaces, although it may be used on flat surfaces as well. The invention is not limited to any particular type of article being inspected, but has particular applicability to the detection of small contour variations that are exhibited as reflected optical distortion in bent glass sheets used for windows in vehicles such as automobiles and aircraft. It should be apparent that articles of other materials such as plastics, metal, or ceramic could be inspected for contour variations by the method and apparatus of the present invention. An example of the type of surface irregularity that the present invention is intended to detect is the waviness sometimes present that is observed in images reflected from the exterior of automotive windows.

Prior to the present invention the technique commonly used to inspect automotive glass for reflected optics has required the use of subjective human observation of the amount of distortion in a piece of glass mounted in front of a reference pattern, usually a series of black and white lines. The glass sample is mounted on edge on a rotatable table approximately midway between the reference pattern and the inspector. The inspector observes the reflection of the pattern from the glass surface by viewing the image at an angle of about 5 degrees between the line of sight and the plane of the surface. This method of quality inspection has several drawbacks and some inherent errors that cause considerable variability in the results. A variation in the angle of view from the fixed inspector's location from one end of the part to the other inherently introduces error into such an inspection system. With a large part, the angle can vary on the order of 20%, which can introduce significant error. The variation in angle is even greater with a curved part. As a consequence, the angle variation causes the opposite ends of the part to be judged unequally even though the optical quality may in fact be uniform. Additionally, human inspectors judge the optical characteristics with a considerable degree of subjective variation. As a result, consistent evaluation of optical distortion quality was difficult by prior art techniques.

Optical power of lenses has been measured using gauges that contact the surface of a lens. These devices measure the curvature of the whole article and are not designed to detect the very small deviations in the curvature that are characteristic of optical defects.

In U.S. Pat. No. 3,470,739 (Takafuji et al.) a scanning device is employed to determine the flatness of a strip of sheet metal. The device employs two contact probes that move along the surface, the relative elevations of which, with respect to a reference plane, are used to calculate the slope of the surface. The arrangement of the patent would not be suitable for measuring the small amplitude irregularities on a surface that are observed as optical distortion, particularly when the part is intended to have an overall curvature. Mere substitution of higher sensitivity probes to detect small changes in surface contour is not feasible due to the signal to noise ratio relative to the magnitude of variations to be detected. Also, such an approach would not take into account the curvature of parts that are not flat by design. The above-referenced patent measures the total slope of the surface which, particularly for curved surfaces, would be superimposed on the optical distortion measurement, thus compounding the problem of signal to noise ratio and the sensitivity of the detecting device relative to its measuring range. The criticality of this difference is apparent when it is considered that a typical automotive transparency may have a depth of bend of several inches, whereas the amplitude of severe optical distortion may be on the order of 0.001 to 0.005 inch, and inspection systems of the type involved here would preferably be able to detect distortion having amplitudes on the order of about 0.0001 to 0.001 inch.

U.S. Pat. No. 3,135,055 (Butler et al.) discloses an inspection system in which a probe scans the surface of an article and the deflection of the probe is recorded to provide a digital mapping of the surface contour. Such an arrangement does not lend itself to measuring optical distortion on the surface of a curved article since the mapping would include the design curvature as well as the minor surface irregularities, and the order of magnitude difference between the two curvatures renders it extremely difficult to provide the degree of sensitivity required to detect the small amplitude distortion.

U.S. Pat. Nos. 3,311,233 (Helmbrecht), 3,733,704 (Farabaugh), 3,869,800 (Bartlett), and 4,221,053 (Bobel et al.) show contour check fixtures in which a plurality of probes are employed to determine deviations of the overall curvature or shape from the specified contour. These systems are not intended to detect small distortions on the surface, and their sensitivity is limited by the number of probes that can be provided in a given area.

SUMMARY OF THE INVENTION

The present invention provides a method and means for inspecting curved articles with greater sensitivity and accuracy than prior art systems, and is capable of analyzing measurement information to obtain a quality value that is generalized regardless of the size or shape of the article being inspected. The surface topographical characteristics associated with optical distortion to which the human eye is sensitive are measured in isolation from the designed curvature of the article by avoiding measurement of the overall contour. Instead, the present invention employs three-point contact by a sensor head on the surface being analyzed, and the sensor head is provided with rotational and vertical freedom of motion so that the sensor head follows the overall contour of the article as it scans along the surface. Two of the points of contact are support tips that are spaced apart a distance much less than the length of the article, and the third point of contact is a probe that provides an output signal proportional to its elevational displacement. The contact tips establish the end points of an arc segment of the curved surface and the straight line between the two points is a chord of that arc. The probe detects the height of the surface above or below the chord, from which can be calculated the radius of curvature, which is directly related to the optical quality of the surface. As the sensor head scans over the surface, the radius of curvature may be determined at short intervals and plotted against the scan distance. On the resulting plot, gradual curves represent the design curvature variations, and short deviations represent surface distortion.

The sensor head may be moved by hand over the surface of the article, and useful information regarding the surface topography will be obtained. But for monitoring a production line for sources of surface distortion, it is preferred to provide consistency in the scan path in a series of articles. For such an application, the apparatus of the present invention may include means to support each article in a uniform orientation and means to provide a consistent relative motion between the sensor head and the article.

It is also preferred to automate the operation of the inspection system of the present invention, and therefore it is preferably associated with digital computer means to receive, store, and process the signals from the sensor or sensors. Output from the system is preferably provided by electronic graphical plotting means.

Because the present invention measures local radius of curvature on the surface of the article rather than the slope, registration of surface distortion is not overwhelmed by measurement of the overall design curvature of the article. The sensor in effect ignores the overall curvature and thus may be provided with a high degree of sensitivity appropriate to the small amplitude of the distortion.

These and other objects of the invention will be better understood from the drawings and from the detailed description of a preferred embodiment that follows.

THE DRAWINGS

FIG. 3 is an enlarged view of the sensor head of the apparatus of FIG. 2.

FIG. 4 is a side view of the sensor head of FIG. 3.

DETAILED DESCRIPTION OF THE INVENTION

Figure 1:
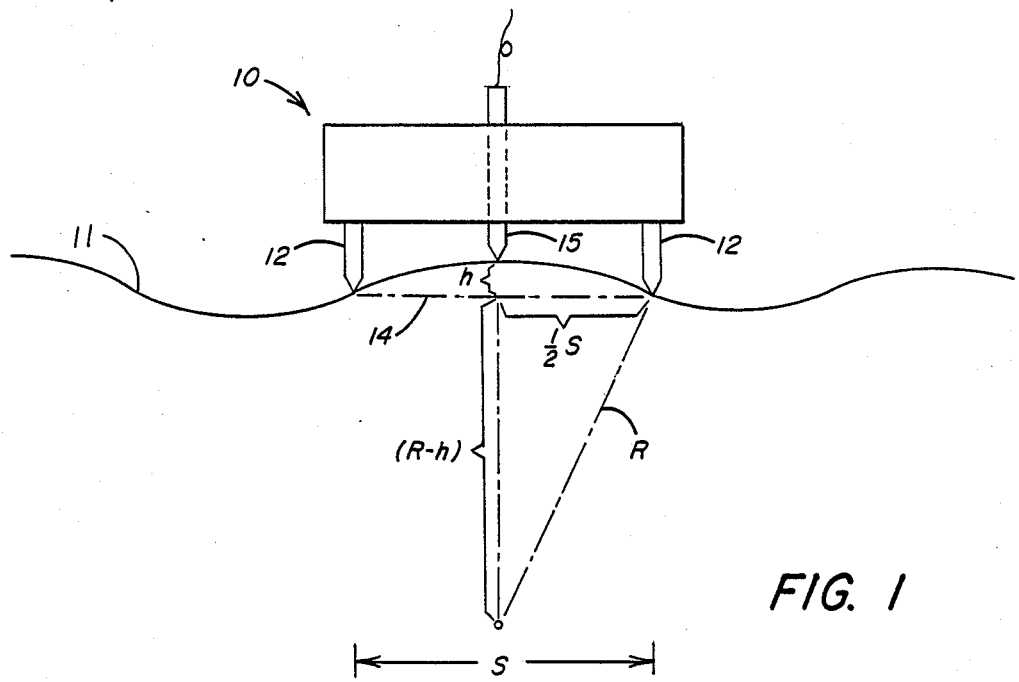
FIG. 1 is a schematic diagram of a sensor head in accordance with the present invention in contact with a surface having surface irregularities.

FIG. 1 shows schematically a sensor head 10 in accordance with the present invention in contact with a surface 11 having unwanted variations that have been shown exaggeratedly. The surface variations that exhibit themselves as distortion in an article such as a glass transparency may have a wide variety of shapes, magnitudes, and wavelengths which may be superimposed on the design contour. Usually a variety of surface variation patterns are superimposed on each other, and a precise mathematical representation of the distortion pattern can be very difficult to analyze. A simplified, typical pattern, as shown in FIG. 1, may be best described as being generally sinusoidal, but for purposes of the present invention it has been found that sufficiently accurate measurement may be obtained if the assumption is made that each segment of the measured scan line represents distortion that is approximately circular. In other words, each segment of the surface can be approximately matched with a segment of a circle having a radius R. It can be shown mathematically that any non-uniform surface can be related to a circular radius of curvature at any location on the irregular surface. If two contact tips 12 of the sensor head 10 rest on the surface of this segment spaced apart a distance S they describe a chord 14 having length S of the circle having radius R. A third contact point may be provided by a probe 15 carried on the sensor head 10 with freedom to move in the direction normal to the article surface being measured. The probe 15 may be embodied as a linear displacement transducer. When the probe 15 is in a line between the contact tips 12, any irregularity in the surface will cause the probe tip to be displaced above or below the chord 14 a distance h. When the probe 15 is at the precise midpoint between the contact tips 12, a right triangle is formed having the sides $\frac{1}{2}S$, $R-h$, and $R$, thereby permitting the following equation to be written:

$$(\tfrac{1}{2}S)^2 + (R-h)^2 = R^2$$

Simplifying this equation and neglecting very small terms yields the relationship:

$$R = S^2/8h$$

Since S is predetermined by the spacing between the contact tips and is a known quantity, determination of the radius depends solely on the value of h which is provided continuously by the output of the probe 15. By coupling the output of the transducer to appropriate calculating means such as a digital personal computer, a continuous reading of the radius of the surface distortion can be provided as the sensor head is moved across the surface of the article. The radius may be used directly as an indication of the distortion quality of the article surface, or other expressions such as optical power may be calculated therefrom.

Selection of the span distance S between the contact tips 12 has an effect on the output of the inspection system of the present invention. Optimally, the span length is about one half of the wavelength of the dominant distortion pattern. Surface wavelengths on automotive glass that produce reflected distortion to which the human eye is sensitive are generally from about one half inch to several inches in length, and as much as the width of the part. Therefore, a suitable span length may be in the range of 1 to 4 inches. A particularly effective span length for inspecting automotive glass is 2 inches. At a 2 inch span length the calculation for the radius reduces to:

$$R = \frac{1}{2h}$$

Figure 2:
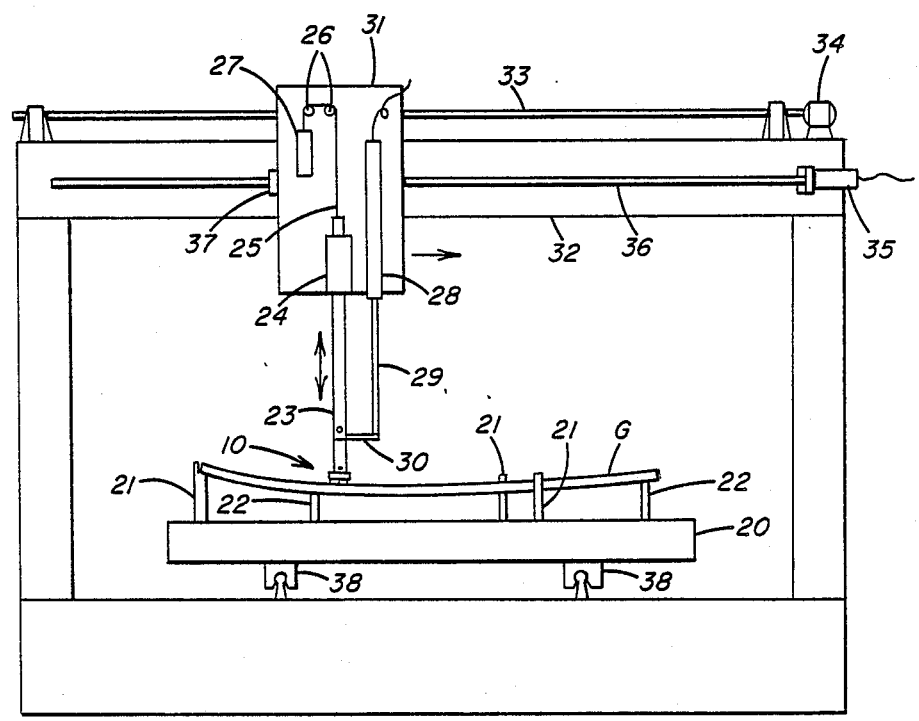
FIG. 2 is a side view of a preferred embodiment of the present invention wherein a curved sheet of glass may be indexed and mechanically scanned with a sensor head.

A sensor head such as shown in FIG. 1 may be manually moved across the surface to produce a series of readings indicative of the distortion quality. But to obtain readings on a series of articles that can be compared to each other, it is preferred to provide means to establish a fixed locus for the scan across each article. An example of such an arrangement is shown in FIG. 2 where a sheet of glass G is received in an indexed position on a table 20, and a sensor head 10 scans the sheet in a straight line by means of an overhead carriage arrangement. Notched indexing pins 21 around the perimeter of the sheet establish a fixed position for each successive sheet of the same shape. Additional pins 22 may be provided to steady the sheet at a predetermined attitude in the indexed position.

The sensor head 10 in FIG. 2 is shown in greater detail in FIGS. 3 and 4. The sensor head has three-point contact with the glass surface, with the three points aligned with the direction of scanning. As shown in FIG. 2, the sensor head may be mounted at the end of a shaft 23 that is free to move in the vertical direction. The shaft 23 is preferably prevented from rotating so that the sensor head remains aligned with the scan direction. By way of example, the shaft 23 may be square in cross section and may be slideably received in a square bushing 24. The weight of the sensor head and the shaft may be sufficient to maintain the contact tips pressed against the surface being analyzed. A cable 25, attached to the shaft 23, pullies 26, and counterweight 27 may be used to reduce the amount of pressure on the surface so as to promote free sliding of the tips over the surface without marring the surface. Optionally, there may be provided means to measure the general contour of the surface. This may be embodied as a linear transducer 28 having a shaft 29 affixed to the sensor head shaft 23 by a bracket 30. The displacement range of the transducer 28 may be on the order of ten inches for use with curved automotive glass parts. The output from the contour measuring transducer 29 may be used to plot a contour curve separately from the surface quality output reading, or the two outputs may be combined to produce a composite curve. A commercially available transducer appropriate for this use is the model 111V made by Vernitech division of Vernitron Corporation of Deer Park, N.Y.

The bushing 24 that holds the sensor head shaft 23 is affixed to a carriage 31 that reciprocates horizontally along a beam 32 so as to carry the sensor head 10 along a linear path from one edge of the glass sheet G to the other edge. Any suitable drive means may be used for the carriage, the example illustrated in FIG. 2 being a threaded shaft 33 rotated by a motor 34. The position of the carriage 31 along the beam, and thus the location of the sensor head 10 on the glass sheet G, is recorded, for example, by means of a linear displacement transducer 35 mounted on the beam 32. A rod portion 36 of the transducer extends through an annular magnet holder 37 carried on the carriage 31 and interacts therewith to provide an indication of the location of the magnet holder 37 along the rod 36. Linear displacement transducers of this type are commercially available, an example of which is the Temposonics Brand style 02 made by MTS Systems Corporation, Plainview, N.Y.

Instead of moving the sensor head over the surface of the article, it should be apparent that the article could be moved relative to a stationary sensor head. This mode of scanning may be employed in the arrangement shown in FIG. 2 for scanning in the horizontal direction transverse to the direction of travel of the carriage 31. The sensor head 10 may be turned 90° about the vertical axis on the end of the shaft 23 to set up the apparatus for the transverse scan. The table 20 and the glass sheet G carried thereon may be translated in a straight line under the sensor head by way of linear bearings 38 that support the table. It may also be desirable in some cases to scan the surface more than once in the same direction, along paths generally parallel to each other. For example, it may be useful in obtaining an overall surface quality evaluation to scan across a central region and along top and bottom marginal regions. This can be accomplished by relocating the article under the sensor head 10 by moving the table 20 between passes of the carriage 31.

Turning now to FIGS. 3 and 4, the details of the sensor head of the preferred embodiment may be seen. The contact tips 12 may be comprised of small roller bearings fastened to the underside of a base block 40. The probe tip 41 of the transducer 42 may also be in the form of a roller bearing. The roller bearings are preferred for the sake of avoiding scratching of the article surface, but other low friction, non-rotating tips may be employed. The base block 40 may be fastened to the bottom end of a stem member 43 that is pivotally held in a clevis 44. Stub axles 45 extending from the sides of the stem member 43 are received in bearings 46 held in the legs of the clevis 44. The clevis 44 is fastened to the bottom end of the shaft 23 by means of a square post 47 held in a square socket in the end of the shaft by means of a set screw 48. The sensor head may accordingly be easily released from the shaft, rotated 90° and reattached for scanning in the transverse direction. The pivoting of the stem member 43 and the base block 40 carried thereon provides to the contact tips 12 the rotational freedom to follow the contour of the surface being scanned. The pivot axis is transverse to the shaft 23 and transverse to the direction of scanning.

The arrangement shown in FIGS. 3 and 4 for retaining the transducer 42 in the sensor head includes a split ring 50 which can be tightened around the transducer by means of a screw 51. A narrowed base portion 52 of the ring 50 is received in a socket in the upper portion of the stem member 43 which is also split and can be tightened around the base portion 52 by means of a screw 53. A central bore 54 in the lower portion of the stem member 43 freely receives the lower portion of the transducer 42. The bore 55 in the split ring 50 through which the transducer passes may be located eccentrically so that rotation of the ring 50 relative to the stem member 43 before the screw 53 is tightened provides lateral adjustability of the transducer so as to align it with the contact tips 12.

The sensor head transducer 42 may be a gaging transducer comprised of a precision, linear, variable, differential transformer with a spring loaded spindle, such as model 0351-0006 from Trans-Tek Incorporated Ellington, Conn. This example of a transducer has a probe tip displacement of plus or minus 0.100 inch with a corresponding output voltage range of plus or minus 10 volts. This example has been found to yield satisfactory results for inspecting automotive glass products, but it should be understood that other applications may require transducers having different capabilities.

The data acquisition and processing system does not form part of the present invention and is within the skill of persons in the art. In general, the system includes a personal computer with commercially available data acquisition software, and a differential input unit with multiplexer for receiving a series of data on a plurality of channels at predetermined intervals. The rotation of the carriage drive screw 33 may be employed to trigger the data sampling interval. The computer may be programmed to provide the output in the form of contour plots produced by a printer, or further mathematical manipulations of the data may be carried out to integrate and sum the surface deviations so as to yield a surface quality number that can be used as an objective evaluation of the product sample.

The invention has been described with reference to a specific embodiment in order to disclose the best mode of the invention, but it should be understood that other variations and modifications as would be known to those of skill in the art may be resorted to without departing from the scope of the invention as defined by the claims that follow.

We claim:

1. A method for measuring surfce irregularities on a curved surface of an article comprising:
   contacting the curved surface with two tips fixed on a sensor head thereby defining an arc segment on the surface between the two points of contact and a corresponding straight line chord between the two points of contact;
   contacting the curved surface with a probe between the two contact tips, the probe being free to reciprocate normal to the surface;
   generating a first signal proportional to the elevation of the probe contact point from the chord and processing the first signal to generate a second signal proportional to the radius of curvature of the arc segment;
   scanning the sensor head along a predetermined path with the tips and probe in contact with the article surface; and
   exhibiting a sequence of readings derived from a series of the second signals so as to indicate the degree of surface irregularity in the curved surface.

2. The method of claim 1 wherein the probe elevation relative to the chord is measured by a transducer.

3. The method of claim 2 wherein the probe elevation is measured in a plane that includes the points of contact of the two tips.

4. The method of claim 3 wherein the probe elevation is measured midway between the two points of contact of the tips on the article.

5. The method of claim 1 wherein the surface of the article being measured has an overall curvature having a relatively large radius and the spacing of the contact tips is less than four inches so as to measure surface deviations of relatively small radii.

6. The method of claim 5 wherein the article being measured is a sheet of glass.

7. The method of claim 1 wherein the article being measured is a sheet of glass.

8. The method of claim 1 wherein the locus of the scan is in a mechanically determined plane.

9. The method of claim 1 wherein surface irregularities being measured cause the probe to be elevated from the chord no more than 0.005 inch.

10. The method of claim 1 wherein surface irregularities being measured cause the probe to be elevated from the chord no more than 0.001 inch.

11. The method of claim 1 wherein the readings indicating the degree of surface irregularity are compared with a predetermined standard so as to determine the acceptability of the article.

12. The method of claim 11 wherein a numerical value representing overall surface quality of the article is calculated from the readings and employed as the basis for comparison with the standard.

13. The method of claim 1, further including indexing the article in a predetermined location relative to the scanning path.

14. The method of claim 13, further comprising indexing and measuring the surface irregularities of a plurality of separate articles having the same general curvature.

15. The method of claim 1 further including scanning the sensor head along a second path.

16. The method of claim 15 wherein the second path is generally transverse to the first path.

17. The method of claim 15 wherein the second path is generally parallel to the first path.

* * * * *